United States Patent [19]

Devanney

[11] 4,269,078

[45] May 26, 1981

[54] EXTENDED RANGE VARIATOR CONVERSION MECHANISM

[75] Inventor: Raymond H. Devanney, Winsted, Conn.

[73] Assignee: Veeder Industries Inc., Hartford, Conn.

[21] Appl. No.: 70,718

[22] Filed: Aug. 29, 1979

[51] Int. Cl.[3] .............................................. F16H 3/22

[52] U.S. Cl. ...................................................... 74/348

[58] Field of Search .................. 74/681, 348, 354, 342

[56] References Cited

U.S. PATENT DOCUMENTS

| | | | |
|---|---|---|---|
| 3,413,867 | 12/1968 | Hamlin | 74/348 |
| 3,875,816 | 4/1975 | Wells | 74/348 |
| 4,136,573 | 1/1979 | Smiglys et al. | 74/348 |

*Primary Examiner*—C. J. Husar

*Assistant Examiner*—Frank Mc Kenzie

*Attorney, Agent, or Firm*—Prutzman, Kalb, Chilton & Alix

[57] ABSTRACT

Conversion of an extended range mechanical fuel pump price variator for selectively substituting an optional $2 unit volume price adder for an optional $1 unit volume price adder.

6 Claims, 2 Drawing Figures

EXTENDED RANGE VARIATOR CONVERSION MECHANISM

DESCRIPTION

Technical Field & Background Art

The present invention relates generally to extended range mechanical fuel pump price variators of the type disclosed in U.S. Pat. No. 4,136,573 of Bruno S. Smilgys et al, dated Jan. 30, 1979, entitled "Extended Range Fuel Pump Computer Price Variator" and operable for establishing and posting the unit volume price of gasoline within an available unit volume price range extending beyond $0.99 9/10 per unit volume, and more particularly relates to the conversion of such extended range variators to further extend the available price range of the variator.

DISCLOSURE OF INVENTION

Because of the rapidly escalating cost of gasoline, the price for a gallon of gasolinein the not too distant future may exceed the maximum available unit volume price of $1.99 9/10 cents per gallon of conventional extended range variators of the type shown in U.S. Pat. No. 4,136,573. It is therefore a principal aim of the present invention to provide conversion means for modifying or converting existing extended range mechanical variators of the type shown in U.S. Pat. No. 4,136,573 for further extending their available unit volume price range.

It is another aim of the present invention to provide new and improved extended range variator conversion means of the type described which does not substantially increase the variator torque load on its driving fuel meter and which permits field conversion of existing extended range variators with minimum inconvenience and downtime.

It is a further aim of the present invention to provide a new and improved mechanical fuel pump price variator having an extended multiple place unit volume price range of $0.00 0/10 to $2.99 9/10 or more.

It is another aim of the present invention to provide a new and improved mechanical fuel pump price variator settable within a unit volume price range extending above $2 or more.

Other objects will be in part obvious and in part pointed out more in detail hereinafter.

A better understanding of the invention will be obtained from the following detailed description and the accompanying drawings of an illustrative application of the invention.

BEST MODE FOR CARRYING OUT THE INVENTION

Figure 1:
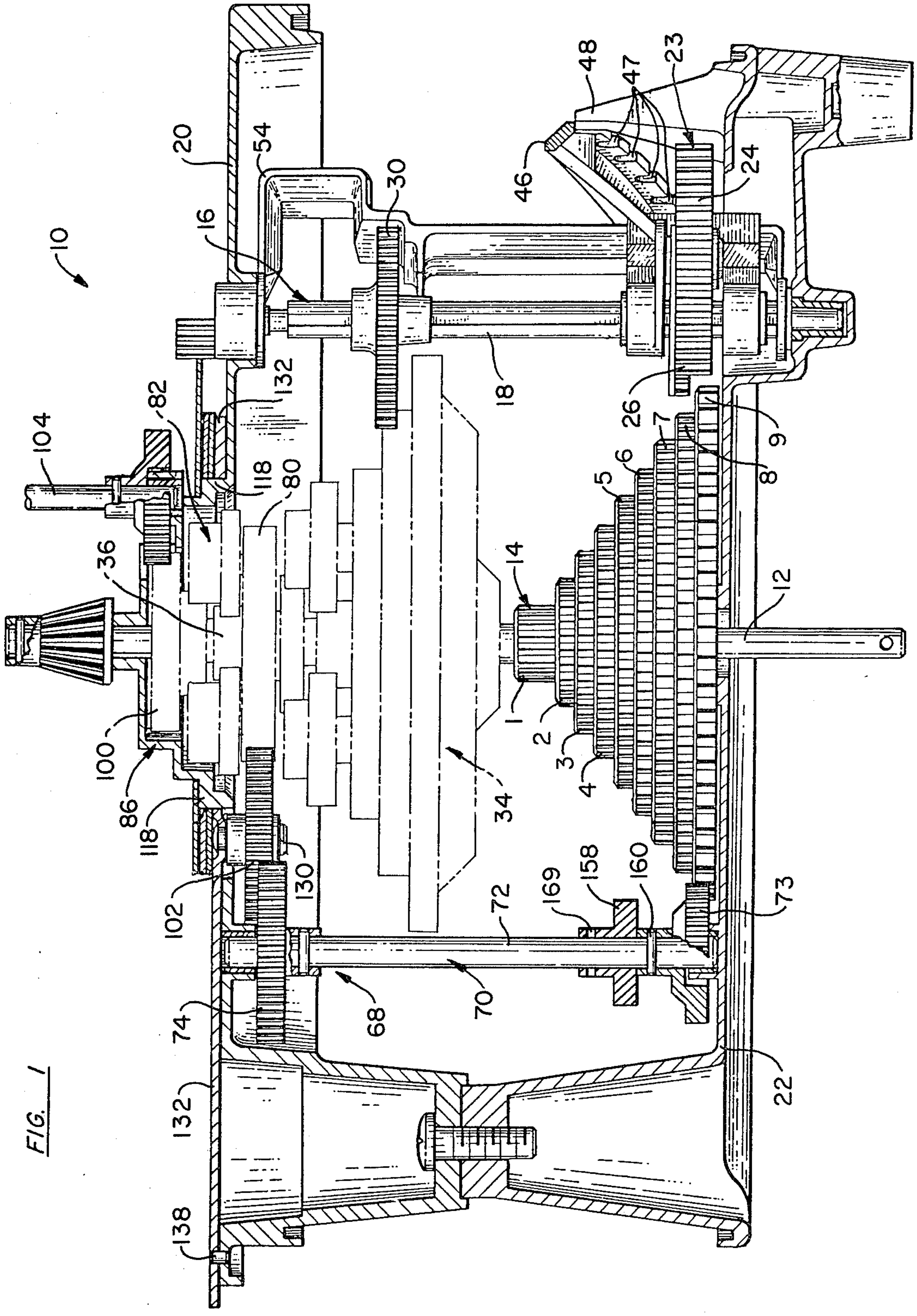
FIG. 1 is an elevation section view, partly broken away and partly in section, of an extended range variator incorporating the present invention.
Figure 2:
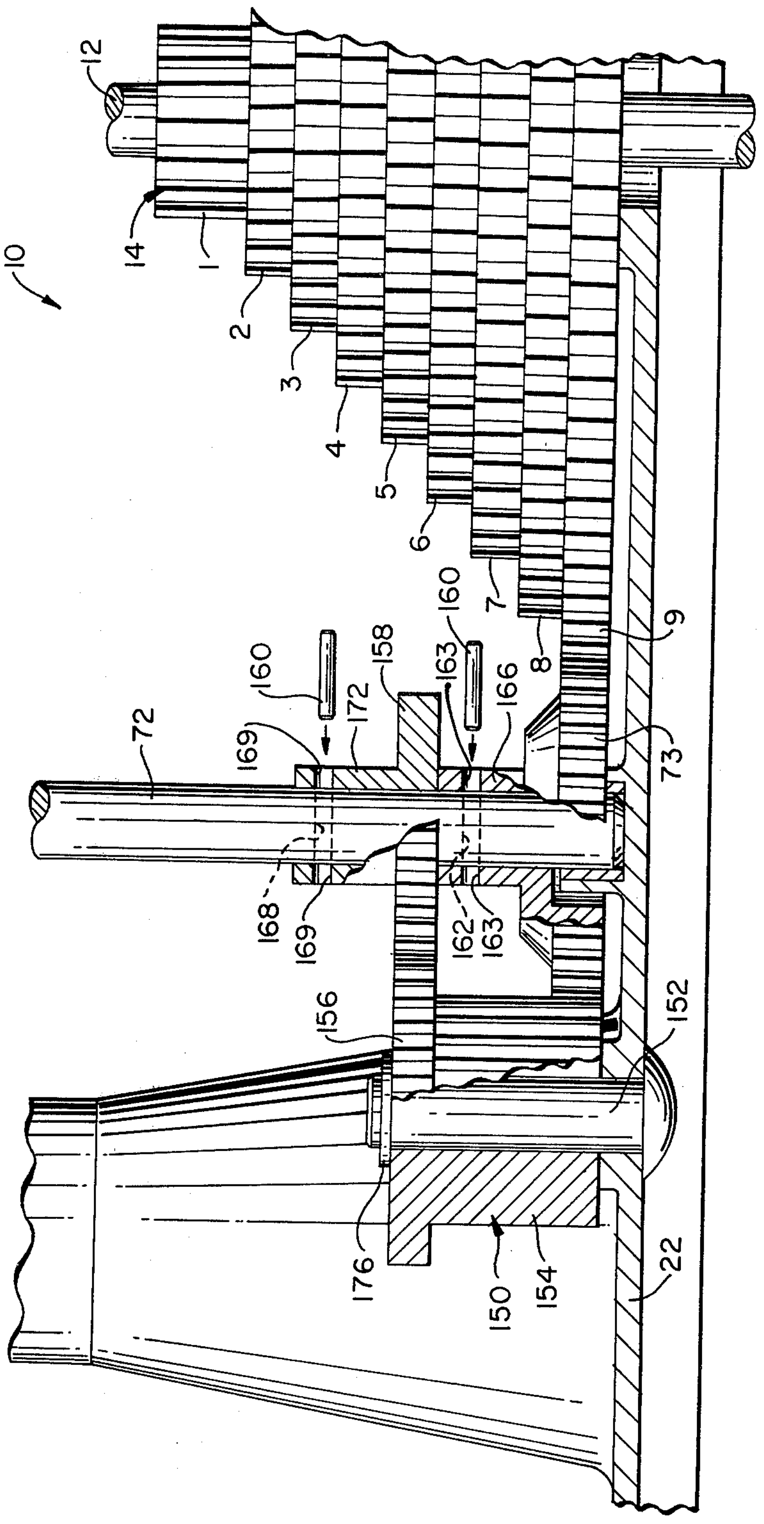
FIG. 2 is an enlarged partial elevation section view, partly broken away and partly in section, of the extended range variator.

Referring now to the drawings in detail wherein like reference numerals indicate like parts throughout, there is shown a mechanical fuel pump price variator or change speed mechanism 10 of the type disclosed in FIGS. 1 & 2 of the aforementioned U.S. Pat. No. 4,136,573 which is operable for establishing and posting the unit volume price of gasoline within a multiple place unit volume price range of $0.00 0/10 cents per unit volume to $1.99 9/10 cents per unit volume in one tenth cent increments.

The variator 10 may be identical to the variator shown and described in FIGS. 1 & 2 of U.S. Pat. No. 4,136,573 excepting as hereinafter described and therefore will not be described in detail herein. Briefly, however, the variator 10 comprises a center shaft 12 adapted to be driven by a conventional fuel meter (not shown) of a gasoline dispensing system in accordance with the volume amount of gasoline dispensed. A nine step cone gear or gear stack 14 having gear steps 1–9 with respective numbers of teeth in accordance with the arithmetic progression 1a; 2a . . . 9a (e.g. 8, 16, 24, . . . 72) is mounted on the center shaft 12 for being driven by the shaft 12. Three range arms or take-off gear assemblies 16 (of which only one assembly 16 is shown in FIG. 1), comprising three parallel equiangularly spaced (i.e., 120° spaced) range arm shafts 18 rotatably mounted on the top 20 and base 22 of the variator frame, are provided for selective engagement with the gear steps 1–9 of the cone gear 14. Each range arm assembly 16 has a range arm 23 pivotally and slideably mounted on the respective range arm shaft 18 and adapted to be pivotally and axially positioned for selective engagement of its outer range arm idler gear 24 with each of the steps 1–9 of the central cone gear 14. An inner range arm gear 26 in mesh with the idler gear 24 is keyed to the range arm shaft 18 for rotating that shaft. A respective range arm output gear 30 affixed to the range arm shaft 18 provides an input into a differential summing mechanism 34 having an output gear 36 rotatably mounted on the variator center shaft 12. The relative gear ratios through the three range arms 23 to the summing mechanism output gear 36, via the range arm output gears and differential summing mechanism 34, are in accordance with the geometric progression 1b, 10b, 100b such that the three range arms operate to set the amount of the lowest, intermediate and highest places respectively of the lower three places of an available four place unit volume price. Thus, for example, with all three range arms 23 in engagement with the lowest and largest gear step 9 (e.g. having 72 teeth) the established lower three places of the four place unit volume price are 999 (e.g. 99.9 cents per gallon). With all three range arms 23 in engagement with the highest and smallest gear step (e.g. having 8 teeth) the established lower three places of the four place unit volume price are 111 (e.g. 11.1 cents per gallon). Also each range arm 23 may be selectively positioned in a lower position out of engagement with the cone gear 14 and with its idler gear 24 in engagement with a fixed tooth (not shown) integrally formed on the base 22. The range arm output is thereby locked against rotation to, in effect, establish a 0 for the respective place of the multiple place unit volume price. Thus, the three lower place range arms 23 can be selectively set into engagement with the respective fixed teeth (not shown) and the cone gear steps 1–9 to establish any unit volume price within a multiple place price range of 00 0/10 cents to 99 9/10 cents.

Each range arm 23 has a notched generally helical detent rack 46 with ten notches 47 for the ten positions of the range arm 23, and the base 22 is formed with a fixed integral detent finger 48 for each range arm for receipt within each of the ten notches 47 of the range arm 46 for accurately positioning the range arm idler gear 24 in angularly and vertically correlated positions for engagement with the respective fixed lockout tooth (not shown) and the steps 1–9 of the cone gear.

Referring to U.S. Pat. No. 4,136,573, the variator 10 has a set of three aligned numeral price posting wheels 50–52 of ascending order of significance on each of two opposed sides of the variator 10. Each numeral wheel 50–52 is mechanically connected to a bail 54 of the respective range assembly 16 to be angularly positioned in accordance with the pivotal position and therefore the setting of the respective range arm 23. Also the indicia 0–9 on each numeral wheel 50–52 are angularly spaced so that each set of numeral wheels provides for posting the lower three places of the unit volume price from 000 to 999 established by the three range arm settings.

The extended range variator 10 also employs an auxiliary unit volume price adder mechanism 68 for expanding or extending the unit volume price range of the variator from three places to four places. As explained in detail in U.S. Pat. No. 4,136,573, the auxiliary price adder mechanism 68 comprises an auxiliary take-off shaft assembly 70 having a vertical take-off shaft 72 (parallel to and suitably angularly offset from the range arm shafts 18) which is adapted to be driven by the central cone gear 14 by a shaft drive gear 73 (e.g. having eighteen teeth) mounted on the lower end of the auxiliary take-off shaft 72 in engagement with the largest gear step 9. The shaft drive gear 73 thereby provides for connecting the variator center shaft 12 for rotating the auxiliary take-off shaft 72 with a drive ratio of 4:1.

An auxiliary differential 82 is mounted coaxially on the center shaft 12 essentially above the differential summing mechanism 34 and immediately below the top or cover 20 of the variator frame, and the output gear 36 of the differential summing mechanism 34 provides one of the two input gears to the auxiliary differential 82. An output gear 100 of the auxiliary differential 82 provides a variator cost output gear adapted to be connected to a conventional fuel pump computer register (not shown, but which for example may be a register of the type disclosed in U.S. Pat. No. 2,814,444 of Harvey N. Bliss dated Nov. 26, 1957, and entitled "Register") for indexing the usual register cost counters (not shown) for registering the cost amount of fuel dispensed in accordance with the volume amount dispensed and the multiple place unit volume price established by the variator setting. The usual register vertical cost shaft 104 is shown in FIG. 1 to illustrate how the cost counter drive train of the register is connected to the auxiliary differential output gear 100.

The auxiliary summing differential 82 is designed to provide a drive ratio from the center shaft 12, via the gears 9, 73 and the auxiliary take-off shaft 72 for selectively adding a fixed higher place price to the lower three place price established by the setting of the three range arms 23. In particular, a fixed higher place price setting of "1" is adapted to be selectively added to the lower three place price setting where as described, a 4:1 drive ratio is provided between the center shaft 12 and the auxiliary take-off shaft 72.

An idler or selector gear 102 is rotatably mounted on a fixed stub shaft 130 depending from a selector lever 132 rotatably mounted on a cylindrical step 118 of a cover dome 86. The idler gear operating lever 132 has two alternative operating positions. In a first operating position established by a frame locating pin 138, the lever 132 is positively located and locked in position with the idler gear 102 in engagement with a take-off shaft output gear 74 and a differential gear 80 of the auxiliary differential 82 to complete an auxiliary higher range drive to the auxiliary differential 82 to input a "1" higher place price setting into the auxiliary differential 82. In the alternative selector lever operating position established by a second frame locating pin (not shown), the selector gear 102 is held out of engagement with the take-off shaft output gear 74 and in operative engagement with a depending fixed tooth (not shown) of the variator cover 20 to input a "0" higher place price setting into the auxiliary differential 82.

Referring to U.S. Pat. No. 4,136,573, an auxiliary pivotal price shutter 152 and an indicator place 154 are provided in general alignment with each set of price posting wheels for selectively displaying the auxiliary higher place price of "1" as selectively provided by the price adder mechanism. In that regard, when the idler gear 102 is in its "1" adder position in operative engagement with the take-off shaft output gear 74, the pivotal shutters 152 are withdrawn from the indicator plates 154 to display with the indicator plates the "1" higher place setting of the auxiliary price adder mechanism 68.

Pursuant to the present invention, and referring particulary to FIG. 2, the extended range fuel pump price variator is modified by installing an auxiliary compound gear 150 on an auxiliary shaft 152 upstanding from the base 22 of the variator frame parallel and adjacent to the auxiliary take-off shaft 72. The auxiliary compound gear 150 comprises a lower relatively small diameter gear 154 (e.g., having fifteen teeth) in engagement with the take-off shaft drive gear 73, and an upper relatively large diameter gear 156 (e.g., having twenty teeth). In addition, an upper take-off shaft drive gear 158 is mounted on the take-off shaft 72 in engagement with the upper relatively large diameter gear 156 of the auxiliary compound gear 150.

The lower take-off shaft drive gear 73 is adapted to be selectively coupled to the take-off shaft 72 with a drive pin 160 inserted through aligned transverse bores 162, 163 in the shaft 72 and in an axially projecting hub 166 of the lower drive gear 73. With the drive pin 160 installed in the lower drive gear 73, the take-off shaft 72 is driven directly by the cone gear 14 to provide a fixed 4:1 drive ratio from the center shaft 12 for selectively adding an auxiliary "1" higher place price with the selector lever 132 as previously described.

The upper take-off shaft drive gear remains uncoupled from the take-off shaft 72 when the lower drive gear 73 is pinned to the shaft 72. By removing the drive pin 160 from the lower drive gear 73 (to uncouple it from the shaft) and then inserting the same or a like drive pin 160 into a second pair of aligned apertures 168, 169 in the shaft 72 and an axially projecting hub 172 of the upper drive gear 158, the take-off shaft 72 is driven by the center shaft 12 via the cone gear step 9, lower drive gear 73, auxiliary compound gear 150 and the upper drive gear 158 to provide a fixed 8:1 drive ratio from the center shaft 12 to the auxiliary take-off shaft 72. That gear train thereby provides for increasing the drive ratio to the take-off shaft 72 by a factor of two for selectively adding an auxiliary "2" higher place price with the selector lever 132. Accordingly, the conversion mechanism provides for selectively substituting an optional $2 adder for the optional $1 adder for expanding or extending the available unit volume price range of the variator from $1.99 9/10 to $2.99 9/10. When the optional $2 adder is selected, a suitable "2" indicator clip or element (not shown) is mounted on each indicator plate (not shown, but identified by the numeral 154 in U.S. Pat. No. 4,136,573) for posting the $2 adder price.

Conversion of the auxiliary price adder mechanism to extend the unit volume price range of the variator by an optional $2 is thereby provided by the installation of two additional gears 150, 158, a stub shaft 152 mounted on the variator base 22 for supporting the compound gear 150, and a locking ring 176 mounted on the upper end of the stub shaft 152 for retaining the compound gear 150 in position. Also, suitable "2" indicator clips or elements (not shown) are provided for posting the $2 adder when the $2 gear train is selected.

Similarly, it is contemplated that for example a three step compound gear (not shown) having a third even larger gear (not shown) above the gears 154, 156 could be employed in place of the two step compound gear described, and an additional take-off shaft drive gear (not shown) is rotably mounted on the take-off shaft 72 immediately above the drive gear 158 and in mesh with the third larger gear. The additional take-off shaft drive gear (not shown) could then be selectively coupled to the take-off shaft 72 in the manner of the take-off shaft drive gears 73, 158 to provide an optional $3 adder in addition to the optional $2 adder described. Also, a multiple step compound gear and take-off shaft drive gears could be employed which provide different drive ratios, for example to provide optional $1.50 and $2 adders in place of the described optional $2 and $3 adders.

As will be apparent to persons skilled in the art, various modifications, adaptations and variations of the foregoing specific disclosure can be made without departing from the teachings of the present invention.

I claim:

1. In an extended range unit volume price variator settable for establishing the amount of each place of a multiple place unit volume price and having a rotary input with a primary stack of coaxial gears adapted to be rotated by a fluid meter in accordance with the volume amount of metered fluid; a plurality of rotatable drive range arm assemblies for a plurality of places of ascending order respectively of the multiple place unit volume price having respective rotatable range arm shafts with axes radially offset from and generally parallel to the axis of the primary gear stack, respective range arms pivotally and axially shiftable on the respective range arm shafts for selective engagement with the primary stack of gears for rotating the respective range arm shafts therewith, and a range arm output gear on each range arm shaft; a rotary differential gear mechanism coaxial with the primary gear stack in engagement with the range arm output gears for combining the rotatable drives through the range arms with relative drive ratios in accordance with their respective places; and an auxiliary higher place price selector mechanism for establishing a next higher place price to said plurality of places of ascending order and having an auxiliary rotatable drive take-off assembly with a rotatable take-off shaft generally parallel to and radially offset from the primary gear stack, a take-off shaft input gear driven by the rotary input and rotatably mounted on the take-off shaft for being coupled for directly rotating the take-off shaft therewith, and an auxiliary take-off shaft driven gear driven by the take-off shaft; a rotary auxiliary differential in operative engagement with said differential gear mechanism; and an auxiliary higher place selector with a shiftable selector lever shiftable between first and second positions thereof and a selector gear rotatably mounted on the selector lever for operatively interconnecting the auxiliary take-off shaft driven gear and auxiliary differential in the first position of the selector lever; the auxiliary differential being operable for combining the rotatable drives through the differential gear mechanism and selector gear with relative drive ratios in accordance with the respective places of the unit volume price and whereby, with the take-off shaft input gear coupled for directly rotating the take-off shaft, the selector gear is adapted to be selectively shifted to its first position for selectively establishing a said next higher place price of "1"; the improvement wherein the extended range variator further comprises a standby conversion mechanism for selectively converting the auxiliary higher place price selector mechanism for selectively establishing a said next higher place price of "2", the conversion mechanism comprising an auxiliary compound gear with first and second relative small and large diameter gears respectively, means for rotatably supporting the auxiliary compound gear with the first relatively small diameter gear thereof in operative engagement with said take-off shaft input gear to be driven thereby, a take-off shaft drive gear rotatably mounted on the take-off shaft in operative engagement with the second relatively large diameter gear of said compound gear and for being selectively coupled to the take-off shaft, and means for selectively coupling said take-off shaft input gear and said take-off shaft drive gear to the take-off shaft for selectively driving the shaft directly with said input gear at a first drive ratio and via the compound gear and said take-off shaft drive gear at a second drive ratio which is twice the said first drive ratio for selectively establishing a said next higher place price of "2" with the selector lever.

2. An extended range unit volume price variator according to claim 1 wherein said take-off shaft input gear is mounted on the take-off shaft in operative engagement with one of the gears of the primary gear stack, and wherein the said take-off shaft drive gear is rotatably mounted on the take-off shaft above said take-off shaft input gear.

3. In an extended range unit volume price variator settable for establishing the amount of each place of a multiple place unit volume price and having a rotary input with a primary stack of coaxial gears adapted to be rotated by a fluid meter in accordance with the volume amount of metered fluid; a plurality of rotatable drive range arm assemblies for a plurality of places of ascending order respectively of the multiple place unit volume price having respective rotatable range arm shafts with axes radially offset from and generally parallel to the axis of the primary gear stack, respective range arms pivotally and axially shiftable on the respective range arm shafts for selective engagement with the primary stack of gears for rotating the respective range arm shafts therewith, and a range arm output gear on each range arm shaft; a rotary differential gear mechanism coaxial with the primary gear stack in engagement with the range arm output gears for combining the rotatable drives through the range arms with relative drive ratios in accordance with their respective places; and an auxiliary price adder mechanism for adding a predetermined unit volume price adder to the unit volume price established by said plurality of range arms and having an auxiliary rotatable drive take-off assembly with a rotatable take-off shaft generally parallel to and radially offset from the primary gear stack, a take-off shaft input gear driven by the rotary input and rotatably mounted on the take-off shaft for being coupled for directly rotating the take-off shaft therewith, and a take-off shaft driven gear driven by the take-off shaft; and a rotary auxiliary differential operatively connected for combining the rotatable drives through the differential gear mechanism and the take-off shaft driven gear with relative drive ratios establishing, with the take-off shaft input gear coupled for directly rotating the take-off shaft, a predetermined price adder of a; the improvement wherein the extended range variator comprises a standby conversion mechanism for selectively converting the auxiliary price adder mechanism for establishing a predetermined price adder of 2a; the conversion mechanism comprising an auxiliary compound gear with first and second relative small and large diameter gears respectively, means for rotatably supporting the auxiliary compound gear with the first relatively small diameter gear thereof in operative engagement with said take-off shaft input gear to be driven thereby, a take-off shaft drive gear rotatably mounted on the take-off shaft in operative engagement with the second relatively large diameter gear of said compound gear and for being selectively coupled to the take-off shaft, and means for selectively coupling said take-off shaft input gear and said take-off shaft drive gear to the take-off shaft for selectively driving the shaft directly with said input gear at a first drive ratio for establishing a price adder of a and via the compound gear and take-off shaft drive gear at a second drive ratio which is twice the said first drive ratio for establishing a said price adder of 2a.

4. An extended range unit volume price variator according to claim 3 wherein a is one dollar.

5. A standby conversion mechanism for an extended range unit volume price variator settable for establishing the amount of each place of a multiple place unit volume price and having a rotary input with a primary stack of coaxial gears adapted to be rotated by a fluid meter in accordance with the volume amount of metered fluid; a plurality of rotatable drive range arm assemblies for a plurality of places of ascending order respectively of the multiple place unit volume price having respective rotatable range arm shafts with axes radially offset from and generally parallel to the axis of the primary gear stack, respective range arms pivotally and axially shiftable on the respective range arm shafts for selective engagement with the primary stack of gears for rotating the respective range arm shafts therewith, and a range arm output gear on each range arm shaft; a rotary differential gear mechanism coaxial with the primary gear stack in engagement with the range arm output gears for combining the rotatable drives through the range arms with relative drive ratios in accordance with their respective places; and an auxiliary price adder mechanism for adding a predetermined unit volume price adder to the unit volume price established by said plurality of range arms and having an auxiliary rotatable drive take-off assembly with a rotatable take-off shaft generally parallel to and radially offset from the primary gear stack, a take-off shaft input gear driven by the rotary input and rotatably mounted on the take-off shaft for being coupled for directly rotating the take-off shaft therewith, and a take-off shaft driven gear driven by the take-off shaft; a rotary auxiliary differential operatively connected to the differential gear mechanism and the take-off shaft driven gear for combining the rotatable drives through the differential gear mechanism and the take-off shaft driven gear with relative drive ratios establishing, with the take-off shaft input gear coupled for directly rotating the take-off shaft, a predetermined price adder of a; the standby conversion mechanism being operable for selectively converting the auxiliary price adder mechanism for establishing a predetermined price adder of 2a, the conversion mechanism comprising a compound gear with first and second relative small and large diameter gears respectively, means for rotatably supporting the compound gear with the first relatively small diameter gear thereof in operative engagement with said take-off shaft input gear to be driven thereby, a take-off shaft drive gear adapted to be rotatably mounted on the take-off shaft in operative engagement with the second relatively large diameter gear of said compound gear and for being selectively coupled to the take-off shaft, the take-off shaft drive gear and said take-off shaft input gear being adapted to be selectively coupled to the take-off shaft for selectively driving the shaft directly with said take-off shaft input gear at a first drive ratio and via the compound gear and take-off shaft drive gear at a second drive ratio which is twice said first drive ratio for selectively establishing a said price adder of 2a.

6. In an extended range unit volume price variator settable for establishing the amount of each place of a multiple place unit volume price and having a rotary input with a primary stack of coaxial gears adapted to be rotated by a fluid meter in accordance with the volume amount of metered fluid; a plurality of rotatable drive range arm assemblies for a plurality of places of ascending order respectively of the multiple place unit volume price adapted for selective engagement with the primary stack of gears; a rotary differential gear mechanism coaxial with the primary gear stack for combining the rotatable drives through the range arm assemblies with relative drive ratios in accordance with their respective places; and an auxiliary price adder mechanism for adding a predetermined unit volume price adder to the unit volume price established by said plurality of range arm assemblies and having an auxiliary rotatable drive take-off assembly with a rotatable take-off shaft generally parallel to and radially offset from the primary gear stack, a take-off shaft input gear driven by the rotary input and rotatably mounted on the take-off shaft for being coupled for directly rotating the take-off shaft therewith, and a take-off shaft driven gear driven by the take-off shaft; and a rotary auxiliary differential operatively connected for combining the rotatable drives through the differential gear mechanism and the take-off shaft driven gear with relative drive ratios establishing, with the take-off shaft input gear coupled for directly rotating the take-off shaft, a first predetermined price adder; the improvement wherein the extended range variator comprises a standby conversion mechanism for selectively converting the auxiliary price adder mechanism for establishing a different predetermined price adder; the conversion mechanism comprising an auxiliary gear rotatably supported for being continuously driven by the rotary input, an auxiliary take-off shaft drive gear rotatably mounted on the take-off shaft in operative engagement with said auxiliary gear and for being selectively coupled to the take-off shaft, and means for selectively coupling said take-off shaft input gear and said take-off shaft drive gear to the take-off shaft for selectively driving the shaft directly with said input gear at a first drive ratio for establishing said first predetermined price adder and via said auxiliary gear and take-off shaft drive gear at a second drive ratio different than said first drive ratio for establishing a said different predetermined price adder.

* * * * *